United States Patent [19]
Stirbl et al.

[11] Patent Number: 5,395,070
[45] Date of Patent: Mar. 7, 1995

[54] SOLAR ENERGY CONCENTRATOR ASSEMBLY AND ASSOCIATED METHOD

[76] Inventors: Robert C. Stirbl, 247 Wadsworth Ave., New York, N.Y. 10033; Peter J. Wilk, 185 W. End Ave., New York, N.Y. 10023

[21] Appl. No.: 159,813
[22] Filed: Nov. 30, 1993
[51] Int. Cl.$^6$ ............................................. B64C 39/00
[52] U.S. Cl. .......................................... 244/2; 244/58; 136/292; 126/696; 60/641.11
[58] Field of Search .......................... 244/2, 58, 62, 173, 244/30, 26, 25, 29, 23 C; 126/696–698; 60/641.11, 115; 136/292

[56] References Cited

U.S. PATENT DOCUMENTS

| | | | |
|---|---|---|---|
| 4,002,159 | 1/1977 | Radebold | 126/696 |
| 4,305,555 | 12/1981 | Davis | 244/173 |
| 4,307,711 | 12/1981 | Doundoulakis | |
| 4,364,532 | 12/1982 | Stark | 244/58 |
| 4,534,525 | 8/1985 | Bliamptis | 244/62 |
| 5,074,489 | 12/1991 | Gamzan | 244/2 |
| 5,269,288 | 12/1993 | Stirbl et al. | 244/173 |

FOREIGN PATENT DOCUMENTS

| | | | |
|---|---|---|---|
| 2508248 | 12/1982 | France | 244/173 |
| 2808169 | 8/1979 | Germany | 244/58 |
| 89/03342 | 4/1989 | WIPO | 244/58 |

OTHER PUBLICATIONS

Crawley, "Designing the Space Colony", Aug. 1977.
Cherry, "A concept for Generating Commerical Ele. Power From Sunlight", 9th IEEE Photovotaic Conf, Seattle Wash. Aug. 1970.
Billman et al, "Orbiting Mirrors for Terrestrial Energy Supply" *Radiation Energy Conversion in Space* vol. 61, 1978 pp. 61–80.

*Primary Examiner*—Galen L. Barefoot
*Attorney, Agent, or Firm*—R. Neil Sudol; Henry D. Coleman

[57] ABSTRACT

A solar energy concentrator assembly comprises flexible polymeric sheet which carries an integral optical element in the form of a Fresnel lens for concentrating a substantial amount of incoming solar radiation on a desired location on the earth's surface. Lofting elements such as propeller driven wings is attached to the sheet for providing aerodynamic lift thereto to maintain the optical element a predetermined distance above the surface of the earth. The propulsion system is powered electrically with energy derived from sunlight.

11 Claims, 2 Drawing Sheets

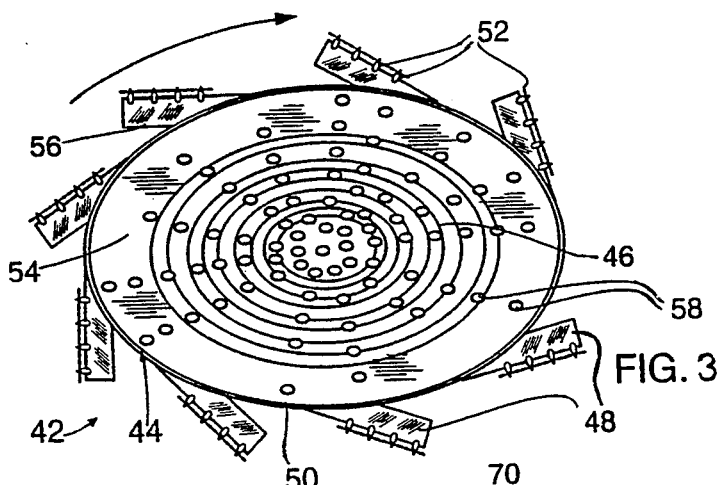
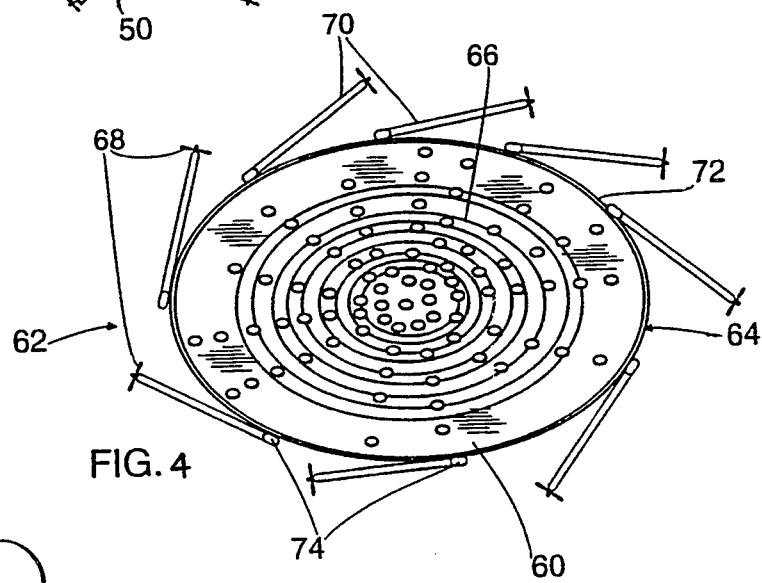
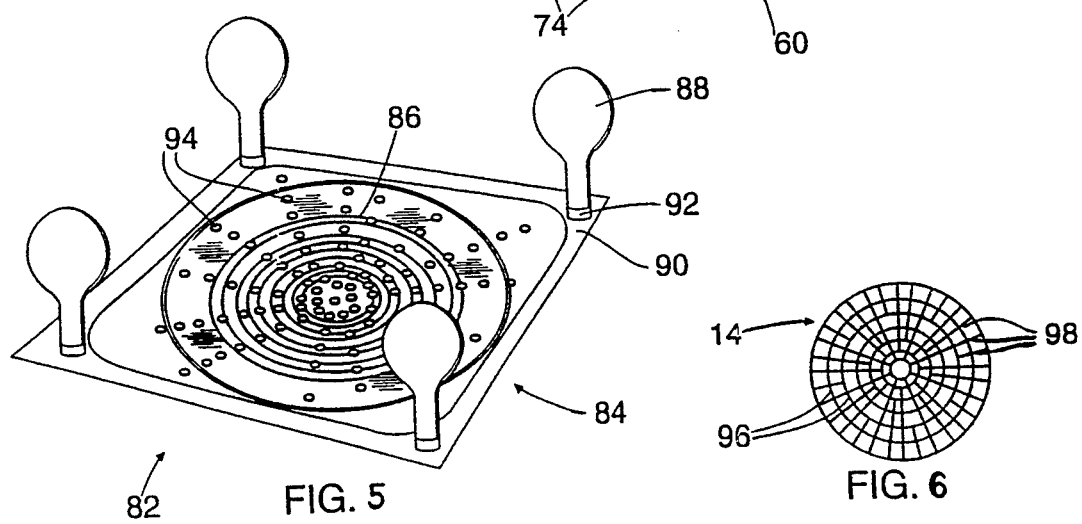

SOLAR ENERGY CONCENTRATOR ASSEMBLY AND ASSOCIATED METHOD

BACKGROUND OF THE INVENTION

This invention relates to a solar energy concentrator assembly and associated method.

It is well known that, with the exception of nuclear power, all of the energy on the earth originates with the sun. Extensive efforts in recent decades have been directed to harnassing solar radiation. Such efforts have resulted in huge mirrors erected on the earth's surface for concentrating incoming solar radiation on energy collectors. Another result of the continuing interest in solar energy is the development of solar cells and the arrangement of such cells in different configurations to convert the solar radiation into electricity. Yet another area of development in the field of solar energy is solar panels for converting solar radiation into heat energy.

All of these conventional techniques for the concentration and collection of solar energy involve large portions of the earth's surface. Generally, the entire area over which solar energy is collected is unavailable for any other use.

OBJECTS OF THE INVENTION

An object of the present invention is to provide a new method for the concentration of solar energy.

Another object of the present invention is to provide such a method which reduces, if not minimizes, that portion of the earth's surface required for collecting substantial amounts of solar energy.

Another, more particular, object of the present invention is to provide such a method which is carried forward through the utilization of solar energy.

A further particular object of the present invention is to provide an apparatus for implementing such a method.

These and other objects of the present invention will be apparent from the drawings and detailed descriptions herein.

SUMMARY OF THE INVENTION

A solar energy concentrator assembly comprises, in accordance with the present invention, a solar concentrator component including an optical element for concentrating a substantial amount of incoming solar radiation. Wing componentry is attached to the optical element for providing aerodynamic lift to the optical element, to thereby maintain the optical element a predetermined distance above the surface of the earth. A propulsion system is connected to the solar concentrator component for propelling the wing or wings through the atmosphere to generate aerodynamic lift due to differential air flow along wing surfaces. A power plant is operatively connected to the propulsion system for supplying power thereto. A solar collector component is mounted to the solar concentrator component and is operatively connected to the power plant for energizing the power plant in response to solar radiation received by the solar collector component.

According to another feature of the present invention, the solar concentrator component includes a sheet of flexible polymeric material. The optical element is mounted to or integral with the sheet, a plurality of different wings being spaced from one another about a perimetric region of the sheet. Thus, the sheet or web functions as a carrier for the optical element. The sheet or web is in turn maintained aloft by the wings under the action of the propulsion system. The propulsion system may include a plurality of different motors also spaced from one another about the perimetric region. Thus, in one embodiment of the invention, a plurality of solar powered airplane components are spaced about the perpiphery of a plastic sheet for keeping the sheet and its integral or attached optical element at a predetermined altitude or within a range of altitudes.

According to another feature of the present invention, the solar concentrator assembly further comprises a control unit operatively connected to the propulsion system for operating the propulsion system to change a disposition of the solar concentrator component in the atmosphere. A sensor may be operatively connected to the control unit for providing the control unit with feedback as to solar energy concentration by the optical element. Thus, the control unit operates the propulsion system to change a disposition of the solar concentrator component in the atmosphere to attain a predetermined level of solar concentration.

Preferably, the optical component is a lens and, more preferably, a Fresnel lens. Such a lens is easily carried on a flexible polymeric sheet which in turn is easily maintained in a predetermined orientation and position in the atmosphere. It is to be noted that the sheet is advantageously provided with an array of air holes for minimizing, if not eliminating, the rippling effects of high-altitude winds. The holes serve to reduce the wind forces on the lens-carrying sheet, thereby enhancing stability, reducing internal stresses, and augmenting predictability and control.

According to another feature of the present invention, the propulsion system includes a multiplicity of propellers and cooperating electric motors, while the power plant includes one or more electrical storage units conductively coupled to the electric motors.

A method for concentrating solar energy comprises, in accordance with the present invention, the steps of (a) providing an optical element capable of concentrating a substantial amount of solar radiation, (b) attaching a plurality of air transport devices to the optical element at spaced positions, (c) operating the air transport devices to maintain the optical element at a predetermined position and orientation above the earth's surface, and (d) modifying the distribution of solar radiation passing through the optical element to thereby concentrate the solar radiation at a predetermined location.

According to another feature of the present invention, the operation of the air transport devices includes the steps of sensing efficacy of solar energy concentration at a predetermined location by the optical element, generating control signals for modifying operation of the air transport devices in response to the sensing input, and transmitting the control signals to the air transport devices.

Where the air transport devices include wings connected to the optical element for providing aerodynamic lift to the optical element and a propulsion unit is connected to the optical element, the operation of the air transport devices includes the step of propelling the wings through the atmosphere to generate aerodynamic lift due to differential air flow past wing surfaces.

Where the air transport devices include balloons, the operation of the air transport devices includes the step of changing effective amounts of a lighter-than-air gas inside the balloons.

According to another feature of the present invention, solar energy is collected at the optical element and used to operate the air transport devices.

A method and associated apparatus in accordance with the present invention for concentrating solar energy is cost effective. Since maintaining the energy concentrating lens at a predetermined height or moving the lens is effectuated by solar powered equipment, the operating costs are virtually zero.

A method and associated apparatus in accordance with the present invention for concentrating solar energy minimizes the extent to which the ground surface is monopolized by the solar concentrator. The concentrator diverts solar energy from some ground areas to others, but does not physically occupy the former areas.

BRIEF DESCRIPTION OF THE DRAWING

FIG. 3 is a schematic isometric view of a flying lens assembly utilizable in the system of FIG. 1.

FIG. 4 is a schematic isometric view of another flying lens assembly utilizable in the system of FIG. 1.

FIG. 5 is a schematic isometric view of a floating lens assembly utilizable in the system of FIG. 1.

FIG. 6 is a schematic view of the frame of the assembly.

DETAILED DESCRIPTION

Figure 1:
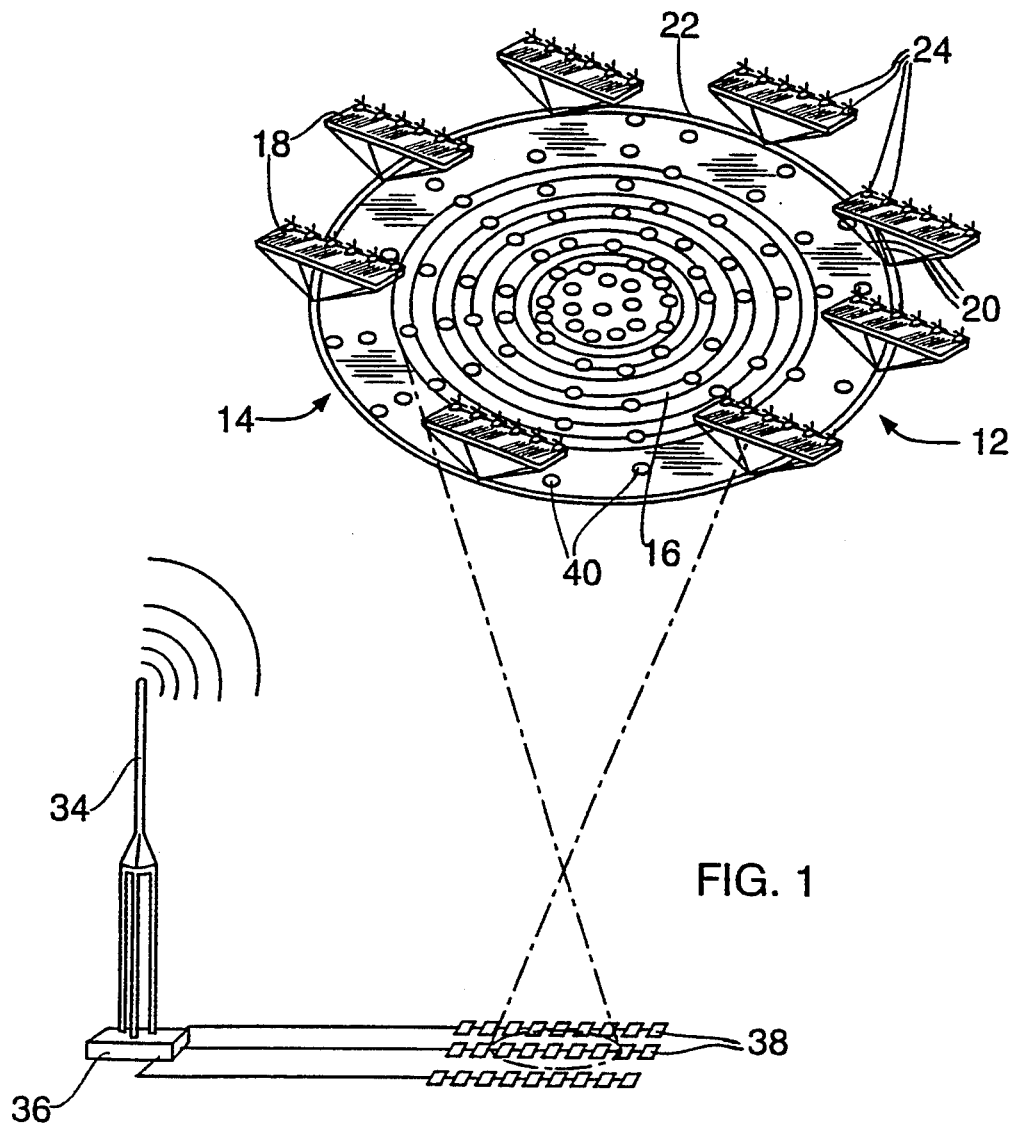
FIG. 1 is a schematic isometric view of an assembly or system for concentrating solar energy, in accordance with the present invention.
Figure 2:
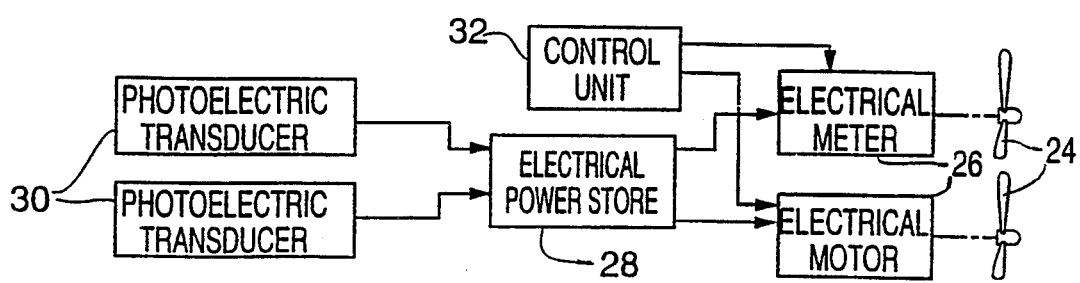
FIG. 2 is a block diagram of selected functional components of a propulsion system in the system of FIG. 1.

As illustrated in FIGS. 1 and 2, a solar energy concentrator system comprises a flying solar concentrator assembly 12 including a solar concentrator component 14 in the form of a flexible sheet or web of polymeric material provided with an optical element 16 in the form of a Fresnel lens for concentrating a substantial amount of incoming solar radiation. Solar concentrator assembly 12 includes a plurality of large platform type wings 18 each connected via cables 20 to respective points spaced perimetrically or circumferentially about a circular rib or frame member 22 at the outer edge of polymeric sheet 14.

Platform wings 18 are similar in structure, operation and design to the unmanned solar-powered Raptor/Pathfinder which is well-known among aerospace engineers. The Raptor/Pathfinder platform wing is an unmanned aerial vehicle designed and built by AeroVironment Inc. of Monrovia, Calif. Each Raptor/Pathfinder platform wing 18 is provided with a plurality of propellors 24 which are driven by respective electric motors 26 (FIG. 2). Each wing 18 carries a battery of electrical storage cells 28 for the storage of electrical energy harvested by photoelectric transducers or solar cells 30 disposed along the upper surface of the respective wing.

For controlling the motion of wings 18 and consequently the positioning and orientation of Fresnel lens 16, motors 26 are selectively energized in response to signals generated by a control unit 32. Control unit 32 in turn receives instructions and data wirelessly from an antenna 34 located on the earth's surface ES. Antenna 34 is operatively connected to an earth bound control unit 36 which receives input from an array of photoelectric sensors 38. Sensors 38 monitor the intensity and area of electromagnetic energy focused or concentrated by solar concentrator assembly 12 on the surface of the earth.

In response to feedback from sensors 38, control units 32 and 36 cofunction to differentially energize motors 26 so as to adjust the position, altitude and/or orientation of solar concentrator sheet or web 14 and consequently optical element 16. It is to be noted that the control of motors 26 may be effectuated by vitually any combination of control units. For example, each wing 18 may be provided with a local microprocessor (not shown) whose operation is coordinated with that of the other wing microprocessors by a supervisory control unit disposed on solar concentrator assembly 12. The supervisory control unit in turn may be delegated only certain responsibilities or functions, other functions being executed by control unit 36 on the earth's surface ES.

Generally, it is contemplated that wings 18 maintain solar concentrator sheet or web 14 and consequently optical element 16 at a substantially contant distance above the earth's surface ES for months at a time. As in the Raptor/Pathfinder unmanned aerial vehicle, the energy storage batteries 28 provide energy during the hours of darkness to maintain the solar concentrator assembly 12 aloft.

Sheet or web 14 is provided with an array of air holes 40 for minimizing, if not eliminating, the rippling effects of high-altitude winds. Holes 40 serve to reduce the wind forces on the lens-carrying sheet 14, thereby enhancing stability, reducing internal stresses, and augmenting predictability and control.

As illustrated in FIG. 3, another solar energy concentrator system comprises a flying solar concentrator assembly 42 including a flexible sheet or web 44 of polymeric material carrying an integral optical element 46 in the form of a Fresnel lens for concentrating incoming solar radiation. Owing to the contemplated size of sheet 44 and its Fresnel lens 46 (e.g., more than a hundred meters on a side), a substantial amount of radiation is concentrated by the system.

Solar concentrator assembly 42 includes a plurality of large platform type wings 48 each extending generally in a tangential direction to a circular rim or rib 50 at a periphery of sheet 42. As described hereinabove with reference to FIG. 1, platform wings 48 are similar in structure, operation and design to the unmanned solar-powered Raptor/Pathfinder. Each Raptor/Pathfinder platform wing 48 is provided with a plurality of propellors 52 which are driven by respective electric motors (not shown) energized by energy harvested from sunlight by solar cells (not shown) disposed on the upper surfaces of wings 48 and/or along an outer region 54 of sheet 42.

Wings 48, like wings 18, may be provided with ailerons 56 for facilitating positioning and orientation operations. Also, as described above with reference to FIGS. 1 and 2, the motion of wings 48 and consequently the positioning and orientation of Fresnel lens 46, may be controlled by a plurality of microprocessors (not shown) in turn coordinated by a supervising computer in response to signals from a ground based station.

Sheet or web 44 is provided with an array of air holes 58 for minimizing, if not eliminating, the rippling effects of high-altitude winds. Holes 58 serve to reduce the wind forces on the lens-carrying sheet 44, thereby enhancing stability, reducing internal stresses, and augmenting predictability and control.

In the air-borne solar concentrator embodiment of FIG. 2, aerodynamic lift is attained due to differential air flow past differently surfaces of wings 48. In an alternative embodiment illustated in FIG. 4, the air flow guide surfaces (not shown) are provided on a periphery region 60 of a flexible polymeric sheet or web 64 forming a part of an airborne solar concentrator assembly 62. Sheet or web 64 carries an integral Fresnel lens 66 for concentrating incoming solar radiation. Owing to the contemplated size of sheet 64 and its Fresnel lens 66 (e.g., more than a hundred meters on a side), a substantial amount of radiation can be concentrated by the system.

Solar concentrator assembly 62 includes a plurality of propellers 68 having shafts 70 each extending generally in a tangential direction to a circular rim or rib 72 at a periphery of sheet 64. Shafts 70 may be tiltable at their junctions 74 with rib 72 so as to move slightly out of the plane of sheet 64 for purposes of enabling a change in orientation or altitude of the solar assembly 62.

It is to be understood that the concentrator components 44 and 64 in the solar assemblies of FIGS. 3 and 4 continuously rotate in order to maintain their altitude. Altitude can be adjusted by increasing or decreasing the rate of rotation of the concentrator components 44 and 64 about their own centers. The concentrator component or sheet 14 of the embodiment of FIG. 4 can also rotate while being maintained in a desired position. Of course, in that event, the relative orientations of platform wings 18 will vary from one to the next.

As depicted in FIG. 5, another solar energy concentrator system comprises a flying solar concentrator assembly 82 including a flexible sheet or web 84 of polymeric material carrying an integral optical element 86 in the form of a Fresnel lens for concentrating incoming solar radiation. Solar concentrator assembly 82 includes a plurality of helium balloons 88 each connected to a relatively rigid rib or frame 90 at a periphery of sheet 82.

At their bases 92, balloons 88 are provided with liquid helium reservoirs (not illustrated) and control units for opening valves to selectively release helium into the balloons in response to signals from a ground station. Sheet or web 84 is provided with an array of air holes 94 for minimizing, if not eliminating, the rippling effects of high-altitude winds.

As depicted in FIG. 6, any of the solar concentrator sheets 14, 44, 64, 84 described herein may be provided with a lightweight frame of annular and radial reinforcement ribs 96 and 98 to assist in maintaining the sheet in a substantially planar configuration in the upper atmosphere.

It is to be noted that an atmospherically disposed solar concentrator in accordance with the present invention will be effective even if the concentration of incoming solar radiation by the optical element or lens is partial or imperfect owing, for example, to wind effects and other disturbances of the flexible lens-carrying sheet. It is only necessary that incoming solar radiation be effectively concentrated onto an absorption area. It is certainly not necessary to maintain the lens in a condition capable of image formation. Generally, the absorption area is located on the earth's surface, i.e., is an earth bound collector such as an array of photoelectric cells or a steam generator which is connected to turbines, etc. In some minor applications, the collector may be on a balloon or other air bound device. The collector may even be a satellite in orbit around the earth.

It is to be noted further that the concentration of solar energy in accordance with the present invention may be used for purposes other than the generation of electrical power. For example, the method may further comprise the step of altering a climatic condition at or proximate to the location of energy concentration on the earth's surface. For example, the concentrated solar energy may be directed to impinge upon ice in a blocked river, lake or other body of water. The solar energy melts the ice to open up a blocked waterway.

Another climatic condition alterable in accordance with the present invention is humidity. Concentrated solar energy directed by the lofted Fresnel lens upon a body of water, such as the sea or a lake, can rapidly increase the humidity in a region bounding the heated water. Such a marked increase in humidity can reduce the chances of fire in dried coastal areas. In addition, under proper climatic conditions, it may be possible to generate rain over proximate land areas.

Increasing the amount of sunlight falling over a selected area may be used to accelerate drying of wet surfaces in that selected area, for example, a playing field or race track.

The instant invention can also be used to stimulate plant growth, for example, in farming areas.

According to yet another feature of the present invention, incoming solar radiation may be concentrated in or alongside an atmospheric whirlpool (hurricane, tornado) for purposes of causing the whirlpool to dissipate. The atmospherically disposed solar concentrator may be positioned to heat air along the outer periphery of a hurricane, thereby producing one or more ancillary whirlpools acting to oppose the circulation of air in the primary whirlpool, i.e., the hurricane.

Concentrated solar radiation may be used for desalinization purposes. The radiation is directed to and absorbed in a body of salt water. The consequently evaporated water is captured or collected to form an aqueous distillate. The salt water may be pumped or transported over the desert to the predetermined location well inside the boundaries of a desert region. The separated salt may be collected and transported back to the sea.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A solar energy concentrator assembly comprising:
   solar concentrator means including a Fresnel lens integral with a sheet of flexible polymeric material for concentrating a substantial amount of incoming solar radiation onto a surface of the earth;
   wing means connected to said solar concentrator means for providing aerodynamic lift to said solar concentrator means, to thereby maintain said solar concentrator means a predetermined distance above the surface of the earth to effectively concentrate incoming solar radiation onto the surface of the earth;
   propulsion means connected to said solar concentrator means for propelling said wing means through the atmosphere to generate aerodynamic lift due to differential air flow along surfaces of said wing means;

power plant means operatively connected to said propulsion means for supplying power to said propulsion means; and solar collection means mounted to said solar concentrator means and operatively connected to said power plant means for energizing same in response to solar radiation received by said solar collection means.

2. The assembly defined in claim 1 wherein said sheet of flexible polymeric material has a perimetric region, said wing means including a plurality of different wings spaced from one another about said perimetric region.

3. The assembly defined in claim 2 wherein said propulsion means includes a plurality of different motors also spaced from one another about said perimetric region.

4. The assembly defined in claim 1, further comprising control means operatively connected to said propulsion means for operating said propulsion means to change a disposition of said solar concentrator means in the atmosphere.

5. The assembly defined in claim 4, further comprising sensor means operatively connected to said control means for providing said control means with feedback as to solar energy concentration by said solar concentrator means, whereby said control means operates said propulsion means to change a disposition of said solar concentrator means in the atmosphere to attain a predetermined level of solar concentration by said concentrator means.

6. The assembly defined in claim 1 wherein said propulsion means includes a propeller and an electric motor, and wherein said power plant means includes an electrical storage unit.

7. A method for concentrating solar energy, comprising the steps of:

providing a flexible sheet of polymeric material with an integral Fresnel lens capable of concentrating a substantial amount of solar radiation;

attaching a plurality of air transport devices to said sheet at spaced positions;

operating said air transport devices to maintain said sheet at a predetermined position and orientation above the earth's surface; and modifying the distribution of solar radiation passing through said Fresnel lens to thereby concentrate the solar radiation at a predetermined location on a surface of the earth.

8. The method defined in claim 7 wherein said step of operating includes the steps of:

sensing efficacy of solar energy concentration at a predetermined position on the surface of the earth by said Fresnel lens;

in response to said step of sensing, generating control signals for modifying operation of said air transport devices; and transmitting said control signals to said air transport devices.

9. The method defined in claim 7 wherein said air transport devices include wing means connected to said sheet for providing aerodynamic lift to said sheet, propulsion means connected to said sheet, said step of operating including the step of propelling said wing means through the atmosphere to generate aerodynamic lift due to differential air flow past surfaces of said wing means.

10. The method defined in claim 7 wherein said air transport devices include balloons, said step of operating including the step of changing effective amounts of a lighter-than-air gas inside said balloons.

11. The method defined in claim 7, further comprising the steps of collecting solar energy at said sheet and using the collected solar energy to operate said air transport devices.

* * * * *